(12) United States Patent
van Cruyningen

(10) Patent No.: US 6,338,110 B1
(45) Date of Patent: *Jan. 8, 2002

(54) PARTITIONING OF STORAGE CHANNELS USING PROGRAMMABLE SWITCHES

(75) Inventor: Peter van Cruyningen, San Jose, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,109

(22) Filed: Sep. 28, 1998

Related U.S. Application Data (60) Provisional application No. 60/065,914, filed on Nov. 14, 1997.

(51) Int. Cl.$^7$ .............................................. G06F 13/00
(52) U.S. Cl. ........................ 710/131; 710/129; 710/109
(58) Field of Search ................................. 710/131, 129, 710/126, 109

(56) References Cited

U.S. PATENT DOCUMENTS

| | | | | |
|---|---|---|---|---|
| 4,381,543 A | * | 4/1983 | Bunten, III et al. | 710/131 |
| 5,152,141 A | * | 10/1992 | Rumford et al. | 60/39.02 |
| 5,471,586 A | * | 11/1995 | Sefidvash et al. | 710/104 |
| 5,481,677 A | * | 1/1996 | Kai et al. | 710/100 |
| 5,481,679 A | * | 1/1996 | Higaki et al. | 710/128 |
| 5,544,339 A | * | 8/1996 | Baba | 364/248.1 |
| 5,594,924 A | * | 1/1997 | Ottensen et al. | 710/31 |
| 5,841,997 A | * | 11/1998 | Bleiweiss et al. | 710/131 |
| 5,922,077 A | * | 7/1999 | Espy et al. | 714/4 |

OTHER PUBLICATIONS

Solomon, B., "High Availability Features and Configurations", A White Paper, May 2, 1995, printed from internet web–site "http://www.clariion.com/products/mktinfo/hawhtpap.html", 13 pages.

Maxstrat "Noble" brochure and product guide, copyright 1998, Maxstrat Corp., Milpitas, CA.

CLARiiON, "FC5500 Disk Processor Enclosure with Tri-Way Storage Processors", Data General Corp., 1997–1998, printed from internet web–site "http://www.clariion.com/products/fibre/dpe.html", 13 pages.

* cited by examiner

*Primary Examiner*—Ario Etienne
(74) *Attorney, Agent, or Firm*—Conley, Rose & Tayon, PC; B. Noël Kivlin (57) ABSTRACT

A data storage system having a first storage channel, a first controller coupled to the first storage channel, a first storage device coupled to the first storage channel, a second storage channel, a second storage device coupled to the second storage channel, and a switch coupled to the first storage channel and the second storage channel. The switch separates the first storage channel from the second storage channel in a first state and connects the first storage channel and the second storage channel in a second state. Also described is a method of controlling a data storage system having a first storage channel, a first storage device coupled to the first storage channel, an operational controller coupled to the first storage channel, a second storage channel, a second storage device coupled to the second storage channel, and a switch coupled to the first storage channel and the second storage channel. The method includes detecting whether an operational controller is coupled to the second storage channel and if an operational controller is coupled to the second storage channel, then opening the switch.

47 Claims, 6 Drawing Sheets

PARTITIONING OF STORAGE CHANNELS USING PROGRAMMABLE SWITCHES

RELATED APPLICATION

This application claims the benefit of Provisional Patent Application No. 60/065,914, filed Nov. 14, 1997.

BACKGROUND OF THE INVENTION

1. Field of Invention

The invention relates to data storage systems, specifically to a new storage channel architecture.

2. Related Art

Storage arrays often include a number of devices, such as disk drives, RAM disks, tape drives, and memory chips, connected to a controller by storage channels, such as a bus or cable. The controller provides an external access interface, managing transfer of data between the external access interface and the storage devices.

For disk drives and RAM disks, a storage array is commonly called a disk array, in which a disk controller connects a host computer to multiple disk drives. The disk controller may provide access to the actual drives in a JBOD (just a bunch of drives) configuration, or the disk controller may perform striping of data across the drives in a redundant array of independent disks (RAID) configuration. Storage channels often include AT Attachment (ATA), small computer system interface (SCSI), fibre channel, or storage system architecture (SSA). The external access interfaces often include industry standard architecture (ISA), bus or peripheral component interconnect (PCI) bus (for host adapters), SCSI, fibre channel, or SSA.

For tape drives, the storage array commonly includes individual tapes or tape silos. The controller may provide data striping capability across the tapes. The storage channels and external access interfaces are usually the same as for disk drives.

For memory chip storage devices, the storage array commonly is the main processor memory, cache memory, or other memory subsystem. The controller commonly performs error detection and correction (parity and ECC) and provides data striping (usually called interleaving). The storage channels are the memory buses. The external access interfaces are commonly PCI bus or processor bus.

In order to maintain access to the storage devices in the event of a single controller failure (to provide high-availability), two controllers may be attached to the same storage devices, in a 'dual-controller' configuration. One controller may provide access to one set of storage devices and the other controller may provide access to another set of storage devices. Such a configuration is to provide access to the storage devices from the surviving controller should one controller fail.

Figure 1:
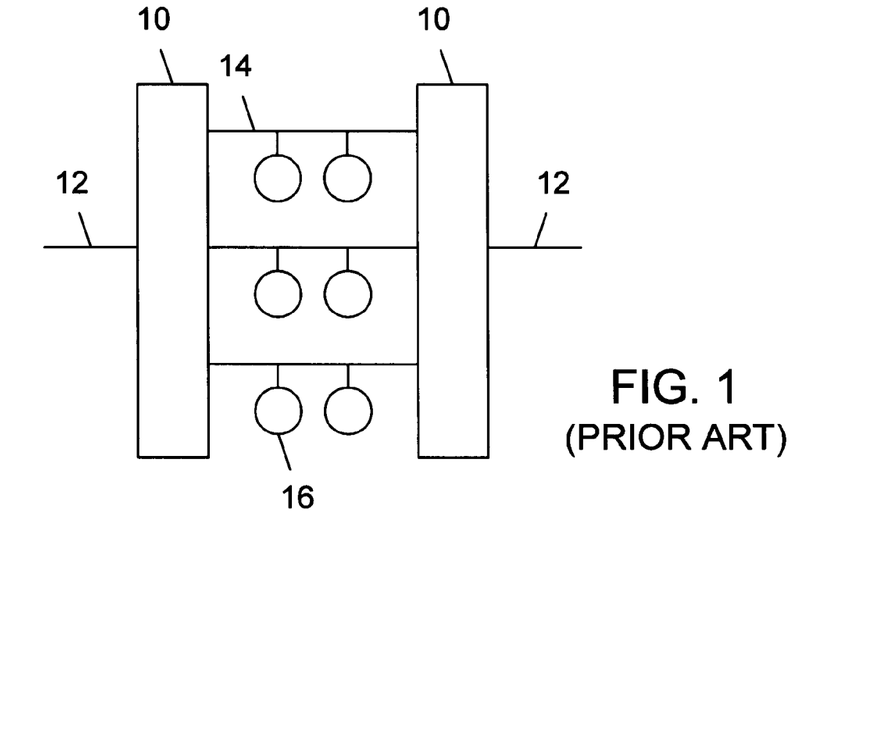
FIG. 1 (Prior Art) shows an architecture of a SCSI based RAID storage system.
Figure 2:
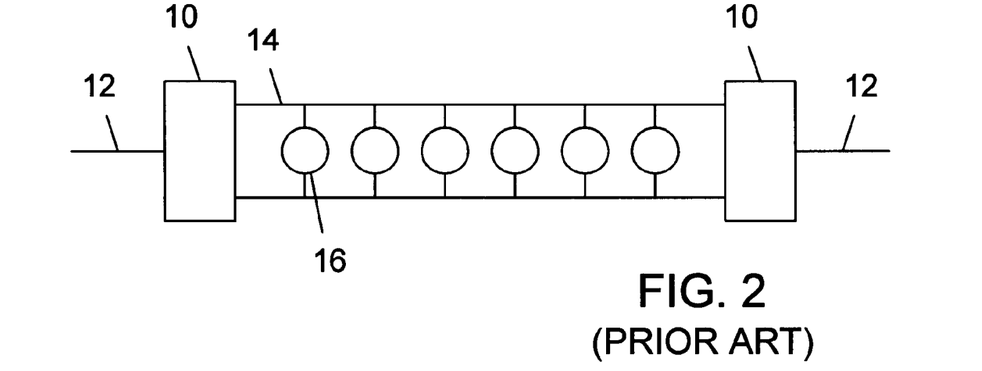
FIG. 2 (Prior Art) shows an architecture of an FC-AL based RAID storage system.

FIG. 1 (Prior Art) shows a storage array with two controllers 10, each with one external access interface 12. Both controllers 10 are connected via three shared storage channels, e.g., channel 14, to six (single-ported SCSI drive) storage devices, e.g., storage devices 16. FIG. 2 (Prior Art) shows a storage array with two controllers 10, each with one external access interface 12. Both controllers 10 are connected via two shared storage channels, e.g., storage channel 14, to six (dual-ported FC-AL drive) storage devices, e.g., storage device 16. In both architectures all of the storage channels are connected to both controllers to allow either controller to access any storage device via any storage channel. For dual-ported storage devices, this configuration allows a single storage channel to fail, while still retaining access to the drive from either controller.

A particular controller supports a maximum number of storage channels. This determines the maximum bandwidth, 'B', for data transfers between the storage devices and the controller. In a dual-controller configuration, the two controllers could potentially support double this bandwidth, 'B×2'; however, since the storage channels are connected to both controllers for high availability, these shared storage channels only support a combined bandwidth of 'B'.

Normally about half of the maximum bandwidth, 'B/2', is used by each controller, since each controller only accesses its own storage devices. Only in the case of a controller failure, does the surviving controller use all its potential bandwidth 'B' on all of the storage channels. So in a normal non-failure case, half of the storage channel bandwidth on a controller, and its associated hardware capability, is unused thereby increasing the cost of the controller.

Furthermore, when additional storage devices are added to a storage array, the maximum bandwidth does not change, so at some point additional storage devices merely add to the total storage data capacity, and not to the storage array performance.

New storage devices may be connected to a new pair of controllers. This however creates a second storage array independent of the original storage array. Having multiple storage arrays increases the complexity and cost of the overall storage subsystem, both in terms of administration and maintenance. Furthermore, a controller in one storage array cannot access a storage device in the other storage array. Therefore, with two independent storage arrays an external switching mechanism (e.g. Fibre Channel switch) may be needed on the external access interfaces to allow an external access interface to transfer data to and from any of the storage devices.

SUMMARY

According to an embodiment of the invention, a data storage system has a first storage channel, a first controller coupled to the first storage channel, a first storage device coupled to the first storage channel, a second storage channel, a second storage device coupled to the second storage channel, and a switch coupled to the first storage channel and the second storage channel. The switch separates the first storage channel from the second storage channel in a first state and connects the first storage channel and the second storage channel in a second state.

According to another embodiment of the invention, a data storage system, comprises a first storage channel, a first controller coupled to the first storage channel, a first storage device coupled to the first storage channel, a second storage channel, a second controller coupled to the second storage channel, a second storage device coupled to the second storage channel, a third storage channel coupled to the first controller and the first storage device, a fourth storage channel coupled to the second controller and the second storage device, and a switch coupled to the first storage channel and the second storage channel. The switch separates the first storage channel from the second storage channel in a first state and connects the first storage channel and the second storage channel in a second state.

According to yet another embodiment of the invention, a data storage system comprises a first storage channel, a first storage device coupled to the first storage channel, and a switch coupled to the first storage channel. The switch is coupled to an interface to couple to a second storage channel that is coupled to a second storage device. The switch separates the first storage channel from the second storage channel in a first state and connects the first storage channel and the second storage channel in a second state.

According to yet another embodiment of the invention, a data storage system, comprises a fibre channel loop, a first plurality of storage devices coupled to the fibre channel loop, a loop resiliency circuit coupled to the fibre channel loop. The loop resiliency circuit has an interface to couple to a second storage channel that is coupled to a second plurality of storage devices, and the loop resiliency circuit is to separate the fibre channel loop from the second storage channel in a first state and to connect the fibre channel loop and the second storage channel in a second state.

Yet another embodiment of the invention relates to a method of controlling a data storage system having a first storage channel, a first storage device coupled to the first storage channel, an operational controller coupled to the first storage channel, a second storage channel, a second storage device coupled to the second storage channel, and a switch coupled to the first storage channel and the second storage channel. The method includes detecting whether an operational controller is coupled to the second storage channel and if an operational controller is coupled to the second storage channel, then opening the switch.

According to yet another embodiment of the invention, a data storage system comprises a first storage channel, a first controller coupled to the first storage channel, a first storage device coupled to the first storage channel, a second storage channel, a second storage device coupled to the second storage channel, a switch coupled to the first storage channel and the second storage channel, and logic that controls the switch according to whether an operational controller is coupled to the second storage channel.

DETAILED DESCRIPTION

This invention allows a single storage channel to be divided into multiple independent partitions using programmable hardware switches. A storage array consisting of a set of storage devices and a controller may be connected to each partition. When a switch is closed, it combines the two adjacent partitions into one partition allowing data transfer to occur across the switch. When a switch is open, it splits a partition into two, thereby doubling the total storage channel bandwidth.

Figure 3:
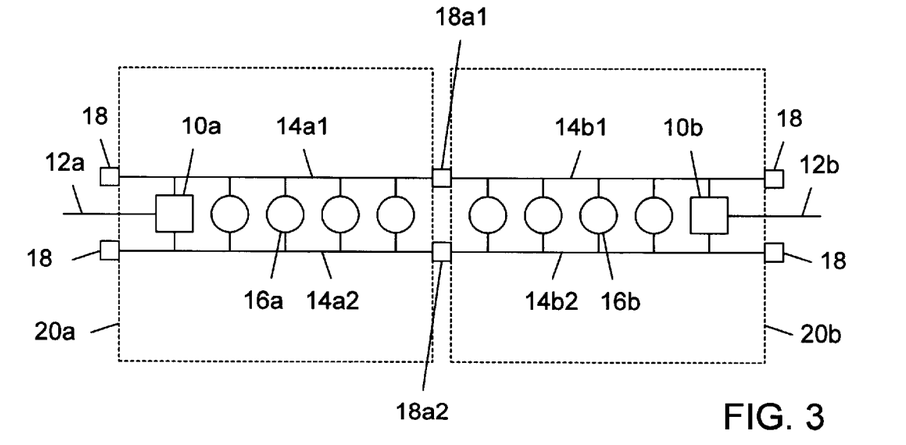
FIG. 3 shows two storage arrays interconnected by a programmable switch.

FIG. 3 shows two connected storage arrays in an architecture with two storage channels and dual-ported storage devices. Storage array 20a has a controller 10a with one external access interface 12a. The controller 10a is connected to its dual-ported storage devices, e.g., 16a, via two storage channels 14a1 and 14a2. Similarly, storage array 20b has a controller 10b with one external access interface 12b. The controller 10b is connected to its dual-ported storage devices, e.g., 16b, via two storage channels 14b1 and 14b2. Storage channel 14a1 is connected to storage channel 14b1 via a hardware switch 18a1. Similarly storage channel 14a2 is connected to storage channel 14b2 via a hardware switch 18a2. These two switches 18a1 and 18a2 connect the two storage arrays 20a and 20b. There are hardware switches 18 on the other ends of the four storage channels 14a1, 14a2, 14b1, and 14b2 which are not connected to other storage arrays.

This configuration helps each controller to use its potential bandwidth both when the controller is servicing only a portion of the drives and when it is servicing all the drives. This configuration thus helps eliminate the expense of unused hardware capability of the prior art. The total bandwidth of a storage array increases linearly with the number of controllers. According to embodiments of the invention, not only storage devices may be added to an existing array, but controllers may also be added to an existing array, thereby increasing performance both from existing storage devices and from new storage devices. When new controllers or storage devices are added to an existing storage array, according to one aspect of the invention, the result is still a single storage array.

An advantage of an embodiment of the invention is that the addition of controllers and storage devices may be achieved without physical movement or recabling, and without interruption in data access (no system down-time). According to an aspect of the invention, a storage array has more than two controllers. Since total bandwidth may increase linearly with the number of controllers, the total performance of the storage array can be scaled. Furthermore, according to an aspect of the invention, every controller has the capability of accessing every storage device, eliminating the need for an external switching mechanism.

Figure 4:
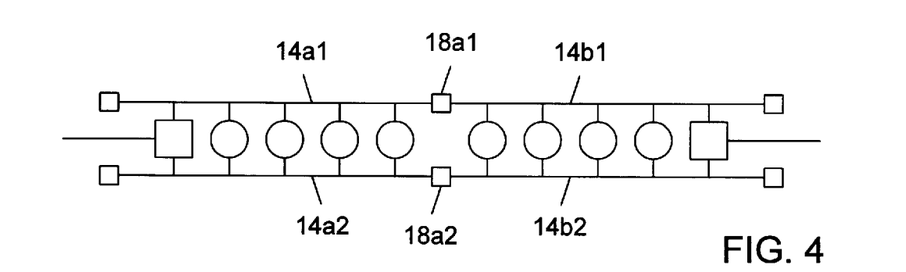
FIG. 4 shows two storage arrays with four independent storage channels.

FIG. 4 shows the two storage arrays connected in a normal configuration in which each controller is accessing its own storage devices. Since the switches 18a1 and 18a2 between the storage arrays are open, there are a total of four independent storage channels 14a1, 14a2, 14b1, and 14b2, each of which can operate at full bandwidth.

Figure 5:
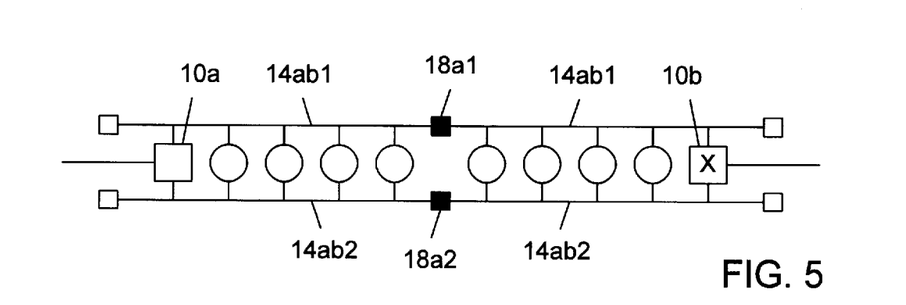
FIG. 5 shows two storage arrays with two shared storage channels.

FIG. 5 shows two storage arrays where one controller 10b has failed. The switches 18a1 and 18a2 between the storage arrays are closed so that there are only two storage channels 14ab1 and 14ab2. The surviving controller 10a has access to all the storage devices using both storage channels 14ab1 and 14ab2.

Figure 6:
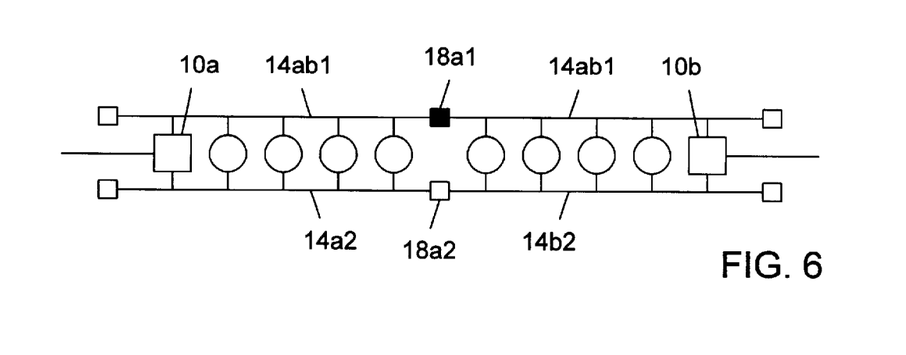
FIG. 6 shows two storage arrays with two independent storage channels and one shared storage channel.

The switches on the storage channels may be configured differently (opened or closed). FIG. 6 shows two storage arrays where switch 18a1 is closed to form one storage channel 14ab1, and switch 18a2 is opened to form two independent storage channels 14a2 and 14b2. This gives controller 10a its own independent storage channel 14a2 for accessing its own storage devices. It also gives controller 10b its own independent storage channel 14b2 for accessing its own storage devices. Both controllers 10a and 10b can also access each other's storage devices using the shared storage channel 14ab1. This shared storage channel 14ab1 may also be used by the controllers 10a and 10b to communicate with each other or to transfer data between each other. One example where data transfer between controllers is useful is for cache mirroring in redundant array of independent disks (RAID) controllers. For performance reasons, a RAID controller commonly caches data within the controller before writing it to the drives. In order to protect against controller failure, this data is mirrored (or copied) in the other controller. The shared storage channel could be dedicated for cache mirroring between the controllers.

Figure 7:
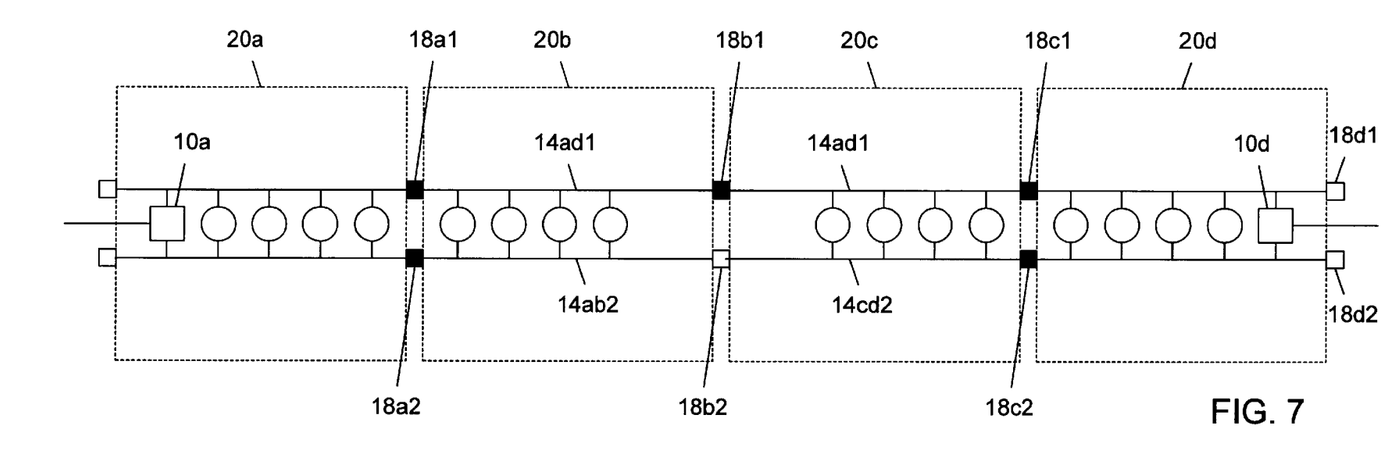
FIG. 7 shows four storage arrays, only two of which have controllers.

In one embodiment of the invention, some storage arrays do not have a controller. FIG. 7 shows four storage arrays, two of which have controllers, and two of which only have storage devices. Storage array 20a has a controller 10a and storage array 20d has a controller 10d. Storage arrays 20b and 20c do not have controllers. The switches 18a1, 18b1, 18c1, 18a2, and 18c2 are closed and the switch 18b2 is open. Storage channel 14ad1 is shared between the two controllers 10a and 10d (e.g. for cache mirroring). Controller 10a also has a storage channel 14ab2 for access to the storage devices in storage array 20a and 20b. Controller 10d also has a storage channel 14cd2 for access to the storage devices in storage array 20c and 20d.

Figure 8:
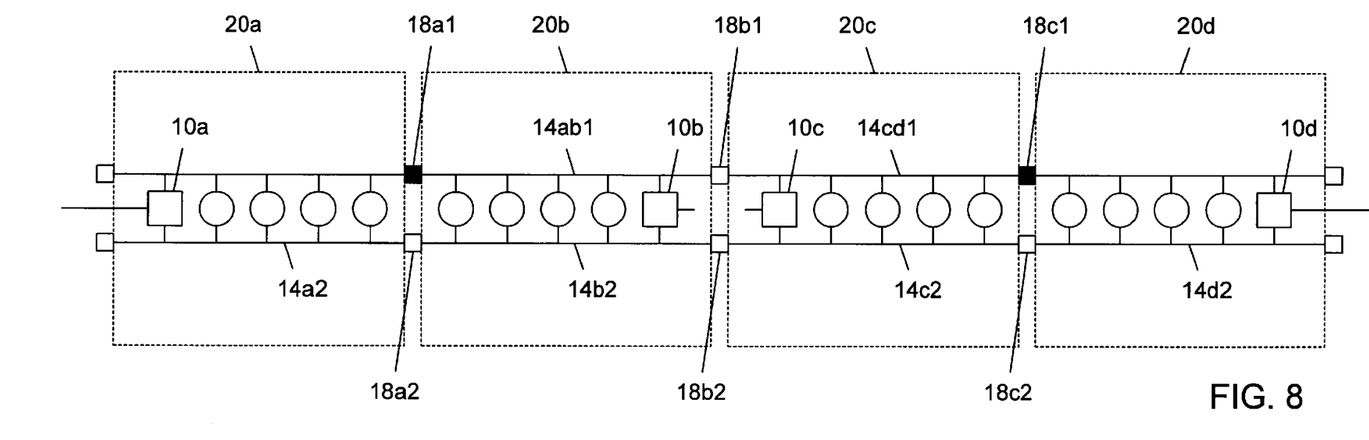
FIG. 8 shows four storage arrays with four independent storage channels and two shared storage channels.

In order to add performance to such a storage system, controllers may be added to the storage arrays which do not have controllers. Controllers may be added and the switches are updated correspondingly to provide each controller with the required bandwidth. FIG. 8 shows an example system with two more controllers 10b and 10c added. Three switches 18b1, 18a2, and 18c2 have been configured so that each pair of controllers share a common storage channel, and each controller also has a storage channel to its own storage devices. Controllers 10a and 10b share a storage channel 14ab1. Controllers 10c and 10d share a storage channel 14cd1. Each controller 10a, 10b, 10c, and 10d also have storage channels 14a2, 14b2, 14c2, and 14d2 (respectively) for accessing their own drives.

Additional storage arrays may also be added to an existing set of storage arrays by attaching them to open switches which only have one storage channel partition attached. In FIG. 7 for example, another storage array could be attached to the right 'end' of the set of storage arrays, and the switches 18d1 and 18d2 updated appropriately.

Figure 9:
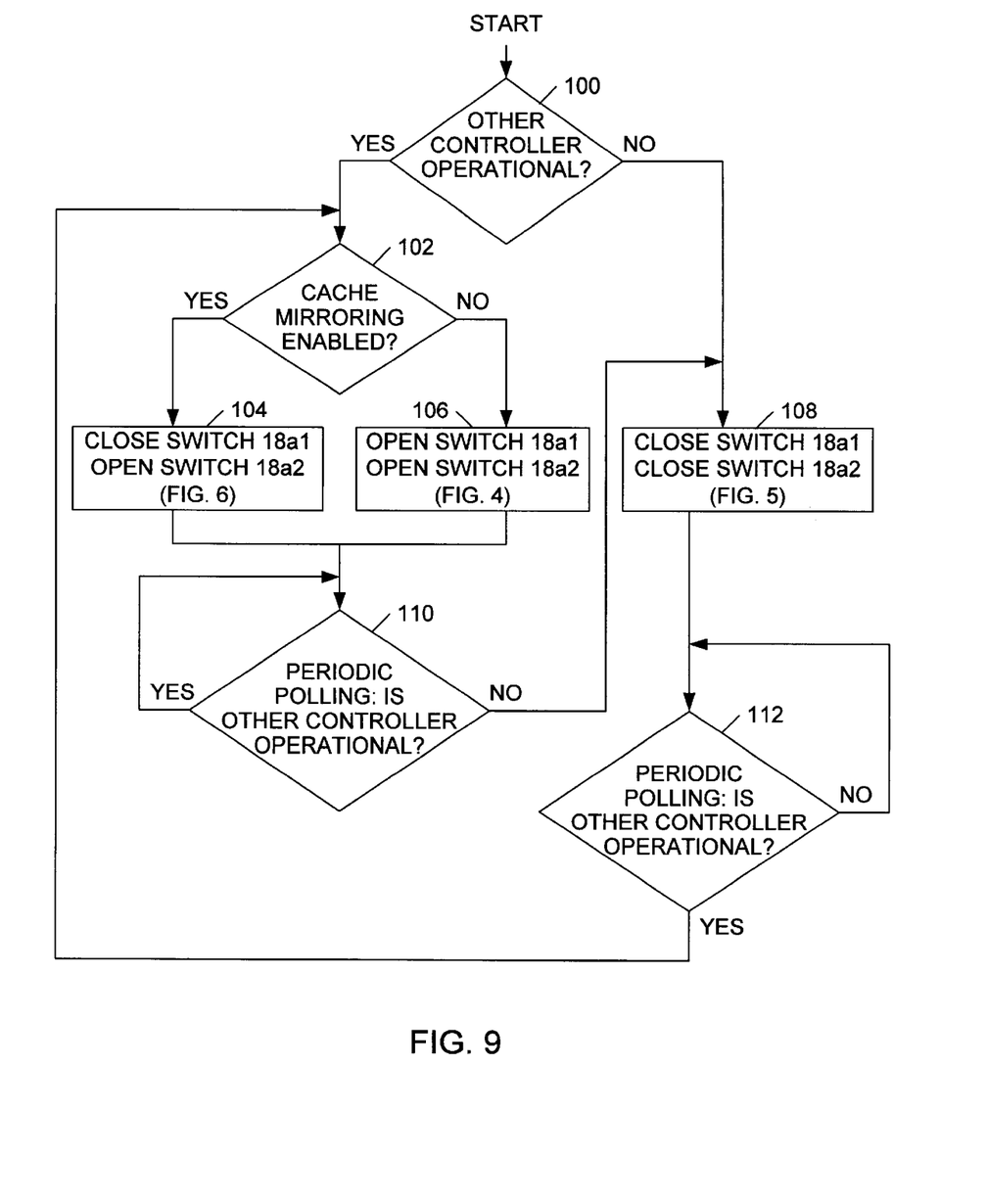
FIG. 9 shows a flowchart of software code that automatically sets switch configuration.

The reconfiguration (opening/closing) of the switches may either be done manually by user intervention or automatically. For example, FIG. 9 shows a flowchart software code that automatically sets the switch configuration based on whether a controller is operational or failed, and whether cache mirroring between controllers is enabled. The determination whether a controller is operational may be based on various mechanisms, such as heartbeat messages between controllers. Whether cache mirroring is enabled may be a static configuration parameter.

First test whether the other controller is operational 100. If not, then both switches 18a1 and 18a2 are closed 108 so the controller can access all the storage devices, as shown in FIG. 5. Thereafter, a periodic polling checks whether the other controller becomes operational 112. If the other controller is operational, either from 100 or 112, then a check is made to see if cache mirroring is enabled 102. If cache mirroring is enabled 102, then switch 18a1 is closed and switch 18a2 is opened 104. The closure of switch 18a1 creates a shared storage channel 14ab1 between the controllers, and the opening of switch 18a2 creates two independent storage channels 14a2 and 14b2, as shown in FIG. 6. If cache mirroring is not enabled 102, then both switches 18a1 and 18a2 are opened 106. This creates four independent storage channels 14a1, 14a2, 14b1, and 14b2, as shown in FIG. 4. Thereafter, a periodic polling checks if the other controller becomes non-operational 110, and if so, the switches are closed 108 to allow the surviving controller access to all the storage devices.

An embodiment of the software checks for the presence of new controllers, in addition to just checking whether existing controllers are operational or failed. Then, if new controllers are added to an existing system, the hardware switches are automatically reconfigured. For example, according to an embodiment of the invention, adding two new controllers to the system in FIG. 7 automatically results in a configuration as in FIG. 8.

An advantage of an embodiment of the invention is the ability to create high availability configurations. For example, according to an embodiment of the invention, a single storage device has more than two controllers, e.g., three controllers, four controllers, or more, according to the needs of the system.

The following example embodiment is an application with disk arrays. Fibre Channel Arbitrated Loop (FC-AL) is used for the storage channels.

Figure 10:
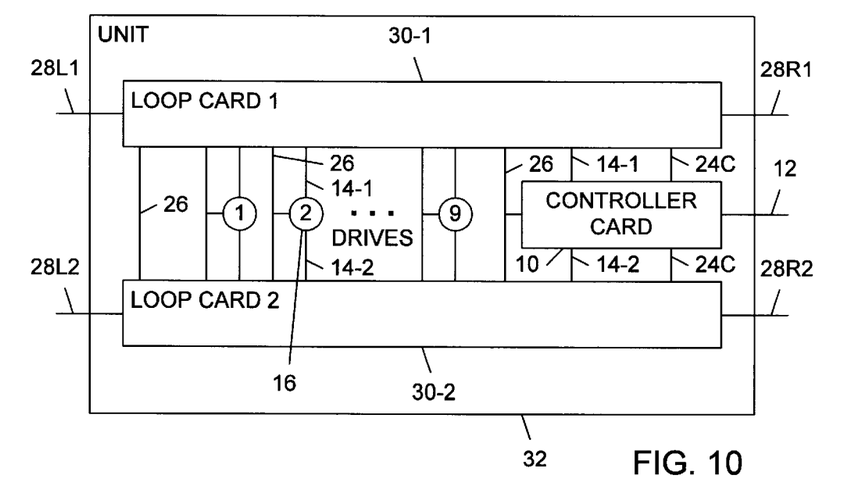
FIG. 10 shows an embodiment of a disk array, with disk drives, a controller card, and loop cards.

FIG. 10 shows a storage array which is a single unit 32 which supports nine disk drives, e.g., disk drive 16, one controller card 10, and two loop cards 30-1 and 30-2. The unit 32 also includes power/packaging/cooling (not shown). The drives, e.g., drive 16, controller card 10, and loop cards 30-1 and 30-2 maybe hot-plugged into and hot-swapped from a passive backplane (not shown) providing high-availability.

The controller card 10 and every disk drive, e.g., disk drive 16, is dual-ported and connected to two independent FC-AL loops 14-1 and 14-2. The hardware circuitry for loop 14-1 is on loop card 30-1. The hardware circuitry for loop 14-2 is on loop card 30-2.

The controller card 10 has an external access interface 12. The example implementation supports an FC-AL access interface for connection to host computers. The controller card 10 supports standard functions of a RAID controller.

Loop card 30-1 has two external connectors 28L1 and 28R1, which support cables (not shown) for connecting to other units. Similarly loop card 30-2 has two external connectors 28L2 and 28R2. A unit may be cabled to two adjacent units (on left and right) via the two connectors on each loop card, such that 28L1 on one unit connects to 28R1 on the unit on the left, and 28L2 on one unit connects to 28R2 on the unit on the left. Each external connector 28L1, 28R1, 28L2, and 28R2 and each interconnection cable supports an FC-AL loop and a serial communication channel.

Status signals 26 from drives, e.g., drive 16, from the controller card 10, and from the loop cards 30-1 and 30-2 indicate whether those components are physically present. These status signals 26 are routed to both loop cards 30-1 and 30-2. A separate serial communication channel 24C runs between the controller 10 and each loop card 30-1 and 30-2.

Loop Card Detail

Figure 11:
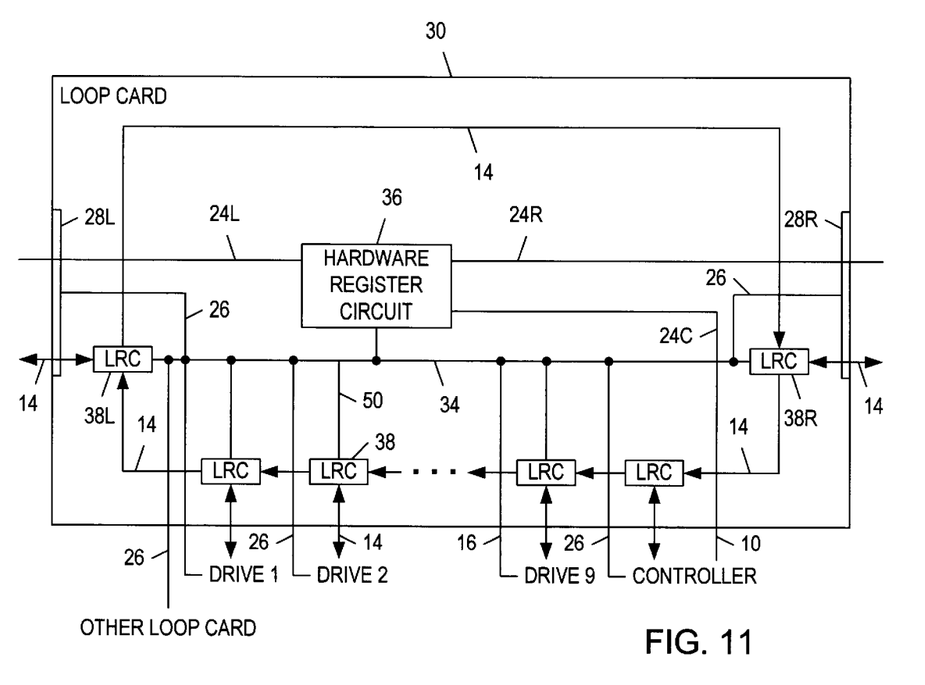
FIG. 11 shows a detailed block diagram of a loop card, with LRC circuits and hardware register circuit.

FIG. 11 shows a block diagram of a loop card 30. Loop resiliency circuits (LRC, also known as port bypass circuits)

38 are used to connect the controller 10 and the disk drives, e.g., disk drive 16, to the fibre channel loop 14. An additional two LRCs 38L and 38R are used on each loop to connect adjacent units to either side (on left and right) of this unit, via the loop card connectors 28L and 28R. The LRCs 38L and 38R implement the programmable hardware switches described in this invention.

Figure 12:
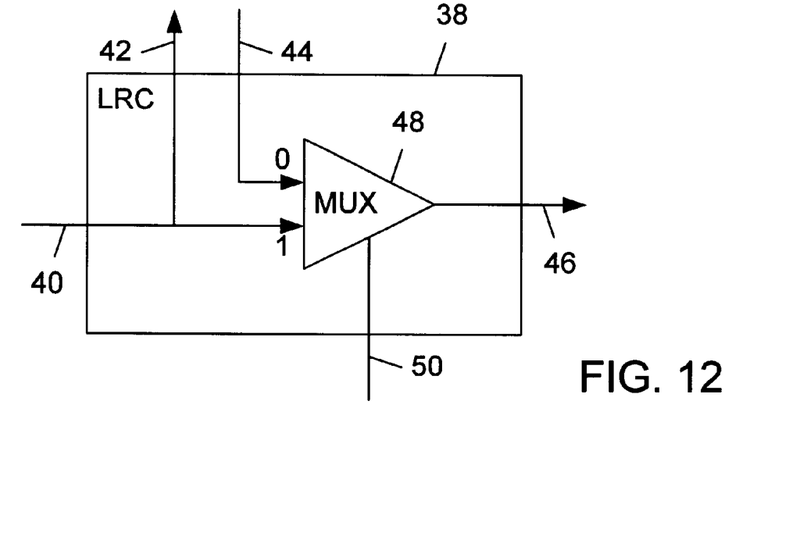
FIG. 12 shows a detailed block diagram of an LRC circuit.

FIG. 12 shows a block diagram of a typical LRC 38 and illustrates that this device can be switched by a signal 50. If the signal 50 is asserted, the device (not shown) attached via signals 42 and 44 is bypassed and the input serial bit stream 40 is routed directly to the output 46. If the signal 50 is deasserted, the device (not shown) attached via signals 42 and 44 is attached to the loop by routing the input bit stream 40 to the device via signal 42, and routing the returning bit stream 44 from the device to the output 46.

As shown in FIG. 11, the LRC control signals 50 are driven, via a control/sense bus 34, by a hardware register circuit 36. The 'component present' status signals 26 from the drives, controller cards, and loop cards are also routed, via a control/sense bus 34, to the hardware register circuit 36. There is also a status signal 26 from each of the left and right connectors, 28L and 28R, indicating whether a cable is present. These status signals 26 along with various control and status signals from the power/cooling system (not shown) are also routed, via the control/sense bus 34, to the hardware register circuit 36.

Three bi-directional serial communication channels, 24C, 24L, and 24R, are connected to the hardware register circuit 36. Channel 24C runs to the controller 10. Channel 24L is connected to the loop card connector 28L for connection to an adjacent left unit. Channel 24R is connected to another loop card connector 28R for connection to an adjacent right unit.

Hardware Register Circuit Detail

Figure 13:
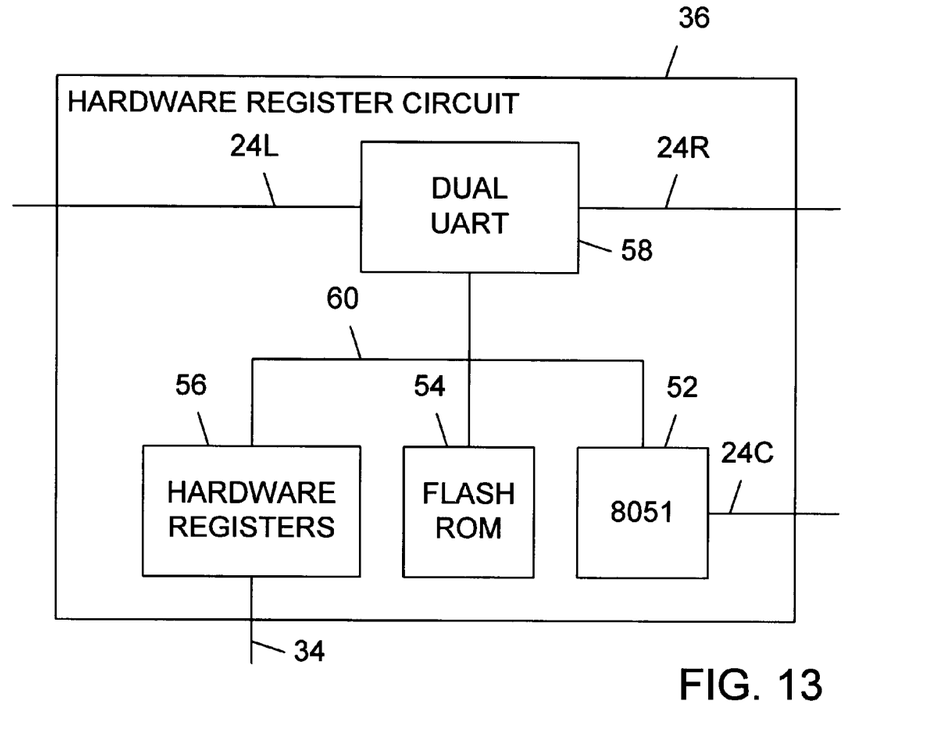
FIG. 13 shows a detailed block diagram of a hardware register circuit.

FIG. 13 shows a block diagram of the Hardware Register Circuit 36 in loop card 30. The hardware registers 56 are connected to the status and control signals 34. The UART in an 8051 microcontroller 52 is connected to the controller communication channel 24C. A separate dual UART 58 provides serial communication channels 24L and 24k for communication with the adjacent units. The FLASH ROM 54 contains 8051 firmware. A data bus 60 connects the hardware registers 56, dual UART 58, FLASH ROM 54, and microcontroller 52.

The firmware in the 8051 microcontroller 52 implements a serial protocol on the serial communication channels 24R, 24L, and 24C. This protocol allows for the reading and writing of the hardware registers 56 from any serial channel 24R, 24L, or 24C. The FLASH ROM 54 may also be reprogrammed via the serial protocol.

Operation

This description refers to FIG. 10 unless otherwise noted. Software is used to automatically reconfigure the loops 14-1 and 14-2 based on the presence of units 32, drives 16, and controllers 10. In this example implementation, the software is executed on the controller cards 10 in the units 32. This allows for easy modification and greater flexibility. Alternatively, processes executed on the controller cards could also be executed by the 8051 microcontroller 52 (FIG. 13) firmware on the loop cards 30-1 and 30-2.

A software task periodically polls the status signals 26 to determine what components are present in unit 32. This polling is done via a serial protocol which supports the reading and writing of the hardware registers 56 (FIG. 13) in a unit. The controller 10 communicates with the 8051 microcontrollers 52 (FIG. 13) on the local unit loop cards 30-1 and 30-2 via the serial communication channels 24C. If the request is for another unit, these 8051 microcontrollers forward the request to the next unit via the serial communication channels 24L and 24R (FIG. 13) on the unit interconnection cables. If necessary, those 8051 controllers in turn forward the request to the next unit.

The LRC circuits 38L and 38R (FIG. 11) are updated accordingly to various rules depending on the configuration of the units and whether cache mirroring is required between controllers. For example, when a new unit is added which does not have a controller card, the LRC circuits 38L and 38R are updated to connect that unit's loops to the existing loops on the unit to which it was attached. This is done by closing the switch, either 38L or 38R (FIG. 11) depending on the position of the new unit. Alternatively if a controller card 10 is added to an existing unit 32, either manually under user control or automatically, the LRC circuits 38L and 38R may be updated to provide that new controller an independent drive loop for its own drives. This is done by switching the LRC circuits 38L and 38R (FIG. 11) accordingly.

Alternative Embodiments

While the above description details particular implementations, for example, with respect to Fibre Channel disk storage arrays, this should not be construed as a limitation on the scope of the invention. Many other variations are possible, some examples of which follow.

Embodiments of the invention include configurations with any number of storage devices and any type of storage device, such as RAM disks, tape drives, and memory devices. Embodiments of the invention include single or multiple storage channels, single or multiple-ported storage devices, and varying topologies.

Alternative topologies include 2-dimensional, 3-dimensional, or N-dimensional arrays with various interconnection architectures, such as N-N and hypercube in addition to single-dimensional array of interconnected storage arrays.

Another topology could be a closed ring of storage arrays in which there are no free 'ends' with unattached switches. For 1-dimensional arrays, a ring forms a circle. For N-dimensional arrays, a ring may form a donut-shape or toroid.

Another topology is a star configuration of storage arrays, again in any number of dimensions. Other topologies will become apparent from consideration of the drawings.

Embodiments of the invention include configurations with any type of storage channel, such as ATA, SCSI, and SSA in addition to FC-AL storage channels.

The hardware switches in this invention may be of various forms. In order to allow automatic configuration of these switches, in some embodiments the switches comprise electronic devices. It is also possible that these switches be mechanical devices that require user intervention to configure. In addition to the switch, the storage arrays may be connected via various types of interconnection, such as a bus, connector, or cable.

The controllers and storage devices need not be removable or replaceable in order to benefit from this invention. The hardware switches allow for alternative access paths to the storage devices from any access interface. The hardware switches also allow for partitioning of the storage channels in various configurations for scaling of bandwidth to suit some data bandwidth requirement.

Various embodiments have been disclosed herein for the purpose of illustration. Modifications and substitutions are possible without departing from the spirit of the invention. Accordingly, the scope of the invention should not be restricted to the embodiments illustrated, but should be determined by the appended claims and their legal equivalents.

What is claimed is:

1. A data storage system, comprising:
   a first storage channel;
   a first controller coupled to the first storage channel;
   a first storage device coupled to the first storage channel;
   a second storage channel;
   a second storage device coupled to the second storage channel;
   a second controller coupled to the second storage channel;
   a switch coupled to the first storage channel and the second storage channel, the switch separating the first storage channel from the second storage channel in a first state and connecting the first storage channel and the second storage channel in a second state; and
   logic that causes entry of the switch into the second state if failure of the first controller is detected;
   wherein the second controller is configured to control the first storage device and the second storage device in response to detection of failure of the first controller.

2. The data storage system of claim 1, wherein the first storage device comprises a disk drive.

3. The data storage system of claim 1, wherein the first storage device comprises a random access memory (RAM) disk.

4. The data storage system of claim 1, wherein the first storage device comprises a tape drive.

5. The data storage system of claim 1, wherein the first storage device comprises a memory chip.

6. The data storage system of claim 1, wherein the first storage channel comprises a fibre channel bus.

7. The data storage system of claim 1, wherein the first storage channel comprises a small computer system (SCSI) bus.

8. The data storage system of claim 1, wherein the first storage channel comprises a storage system architecture (SSA) bus.

9. The data storage system of claim 1, wherein the first storage channel comprises an AT attachment (ATA) bus.

10. The data storage system of claim 1, wherein the first storage channel comprises a memory bus.

11. The data storage system of claim 1, comprising a plurality of storage devices coupled to the first storage channel.

12. The data storage system of claim 11, where the plurality of storage devices comprises disk drives.

13. The data storage system of claim 1, comprising:
    a third storage channel coupled to the first controller and the first storage device; and
    a fourth storage channel coupled to the second storage device.

14. The data storage system of claim 13, comprising a second switch coupled to the third storage channel and the fourth storage channel, the second switch separating the third storage channel from the fourth storage channel in a first state and connecting the third storage channel and the fourth storage channel in a second state.

15. The data storage system of claim 11, comprising a second plurality of storage devices coupled to the second storage channel.

16. The data storage system of claim 1, the switch coupled to a computer for controlling entry of the switch into the first state and second state.

17. The data storage system of claim 1, comprising logic that causes entry of the switch into the first state if a signal is received from the first controller and the second controller.

18. The data storage system of claim 1, comprising logic that causes entry of the switch into the second state and activation of mirroring of data between the first controller and the second controller.

19. The data storage system of claim 1 wherein the first controller comprises RAID controller.

20. The data storage system of claim 1 wherein the first controller comprises a memory controller.

21. The data storage system of claim 1 wherein the first controller comprises a disk controller.

22. The data storage system as recited in claim 1 wherein the logic is configured to periodically poll the first controller to determine whether the first controller is operational.

23. The data storage system as recited in claim 1 wherein the logic includes a microcontroller.

24. A data storage system, comprising:
    a first storage channel;
    a first controller coupled to the first storage channel;
    a first storage device coupled to the first storage channel;
    a second storage channel;
    a second storage device coupled to the second storage channel;
    a switch coupled to the first storage channel and the second storage channel, the switch separating the first storage channel from the second storage channel in a first state and connecting the first storage channel and the second storage channel in a second state;
    logic that causes entry of the switch into the first state if a signal is received from the first controller;
    a second controller coupled to the second storage channel;
    wherein the first controller controls the first storage device and the second controller controls the second storage device when the switch is in the first state; and
    wherein the second controller controls the first storage device and the second storage device when the switch is in the second state.

25. The data storage system of claim 24, wherein the first storage device comprises a disk drive.

26. The data storage system of claim 24, wherein the first storage device comprises a random access memory (RAM) disk.

27. The data storage system of claim 24, wherein the first storage device comprises a tape drive.

28. The data storage system of claim 24, wherein the first storage device comprises a memory chip.

29. The data storage system of claim 24, wherein the first storage channel comprises a fibre channel bus.

30. The data storage system of claim 24, wherein the first storage channel comprises a small computer system (SCSI) bus.

31. The data storage system of claim 24, wherein the first storage channel comprises a storage system architecture (SSA) bus.

32. The data storage system of claim 24, wherein the first storage channel comprises an AT attachment (ATA) bus.

33. The data storage system of claim 24, wherein the first storage channel comprises a memory bus.

34. The data storage system of claim 24, comprising a plurality of storage devices coupled to the first storage channel.

35. The data storage system of claim 24, where the plurality of storage devices comprises disk drives.

36. The data storage system of claim 24, comprising:

a third storage channel coupled to the first controller and the first storage device; and a fourth storage channel coupled to the second storage device.

37. The data storage system of claim 36, comprising a second switch coupled to the third storage channel and the fourth storage channel, the second switch separating the third storage channel from the fourth storage channel in a first state and connecting the third storage channel and the fourth storage channel in a second state.

38. The data storage system of claim 34, comprising a second plurality of storage devices coupled to the second storage channel.

39. The data storage system of claim 24, comprising logic that causes entry of the switch into the second state allowing mirroring of data between the first controller and the second controller.

40. The data storage system of claim 24 wherein the first controller comprises RAID controller.

41. The data storage system of claim 24 wherein the first controller comprises a memory controller.

42. The data storage system of claim 24 wherein the first controller comprises a disk controller.

43. A method of controlling a data storage system having a first storage channel, a first storage device coupled to the first storage channel, an operational first controller coupled to the first storage channel, a second storage channel, a second storage device coupled to the second storage channel, and a switch coupled to the first storage channel and the second storage channel, the method comprising:

detecting whether a second controller is coupled to the second storage channel and is operational;

if the second controller is coupled to the second storage channel and is operational, then opening the switch;

periodically polling the second controller coupled to the second storage channel;

if the second controller is failed, then closing the switch; and wherein the first controller controls the first storage device and the second storage device if the second controller is failed.

44. The method of claim 43, comprising:

if no operational controller is coupled to the second storage channel, then closing the switch.

45. A data storage system, comprising:

a first storage channel;

a first controller coupled to the first storage channel;

a first storage device coupled to the first storage channel;

a second storage channel;

a second controller coupled to the second storage channel;

a second storage device coupled to the second storage channel;

a third storage channel coupled to the first controller and the first storage device;

a fourth storage channel coupled to the second controller and the second storage device;

a first switch coupled to the first storage channel and the second storage channel, the first switch separating the first storage channel from the second storage channel in a first state and connecting the first storage channel and the second storage channel in a second state;

a second switch coupled to the third storage channel and the fourth storage channel, the second switch separating the third storage channel from the fourth storage channel in a first state and connecting the third storage channel and the fourth storage channel in a second state;

wherein the first controller has failed and the first switch is in the second state of the first switch and the second switch is in the second state of the second switch;

wherein the second controller controls the first storage device and the second storage device when the first switch is in the second state of the first switch and the second switch is in the second state of the second switch.

46. A method of controlling a data storage system having a first storage channel, a first storage device coupled to the first storage channel, a first controller coupled to the first storage channel, a second storage channel, a second storage device coupled to the second storage channel, a second storage controller coupled to the second storage channel, and a switch coupled between the first storage channel and the second storage channel, the method comprising:

the first storage controller controlling the first storage device through the first storage channel when the switch is in an open position;

the second storage controller controlling the second storage device through the second storage channel when the switch is in the open position;

monitoring operation of the first controller; and setting the switch to a closed position in response to detecting a failure of the first controller.

47. The method as recited in claim 46 further comprising the second controller controlling both the first storage device and the second storage device after setting the switch in the closed position.

* * * * *